United States Patent [19]

Sugita et al.

[11] 4,385,098
[45] May 24, 1983

[54] MAGNETIC RECORDING MEDIA

[75] Inventors: Ryuji Sugita, Hirakata; Toshiaki Kunieda, Minoo; Hideki Yoshida, Nishinomiya, all of Japan

[73] Assignee: Matsushita Electric Industrial Co., Ltd., Osaka, Japan

[21] Appl. No.: 325,840

[22] Filed: Nov. 30, 1981

[30] Foreign Application Priority Data

Dec. 5, 1980 [JP] Japan ................................ 55-172389

[51] Int. Cl.$^3$ ............................................ B32B 15/00
[52] U.S. Cl. .................................. 428/629; 428/628; 428/639; 428/637; 428/928
[58] Field of Search ................................ 427/127–132, 427/47; 428/900, 694, 695, 629, 628, 639, 637, 928

[56] References Cited

U.S. PATENT DOCUMENTS 3,342,633 9/1967 Bate et al. .......................... 427/130
4,272,563 6/1981 Steck et al. ........................ 427/130

FOREIGN PATENT DOCUMENTS 2146008 3/1973 Fed. Rep. of Germany .

Primary Examiner—Bernard D. Pianalto
Attorney, Agent, or Firm—Burgess, Ryan and Wayne

[57] ABSTRACT

A magnetic recording medium of the type in which a thin magnetic film mainly comprising Co; Co and Ni; Co and Cr; or Co, Ni and Cr is deposited on a nonmagnetic substrate; the thin magnetic film comprises a native oxidized surface adjacent to the film layer at the surface and a deep layer below it; and the average oxygen content in the surface layer is greater than that in the deep layer.

7 Claims, 9 Drawing Figures

MAGNETIC RECORDING MEDIA

BACKGROUND OF THE INVENTION

1. Field of the Invention

The present invention relates to thin-film type magnetic recording media of excellent short wavelength or high-frequency recording characteristics.

2. Prior Art

There has been an increasing tendency for magnetic recording and reproducing apparatus toward recording and reproducing information at higher and higher densities, so that there has been a strong demand for magnetic recording media of excellent short wavelength or high-frequency information recording capability. Conventional magnetic recording media are fabricated in general by applying magnetic powder over a substrate made of high-molecular compounds or nonmagnetic material (and will be referred to as "the coated type" hereinafter in this specification). In order to improve their short wavelength or high-frequency information recording capability, their coercive force and saturation magnetization must be increased, and the magnetic film or layer must be reduced in thickness. However, there are limits to the improvement of the conventional "coated type" magnetic recording medium for better short wavelength or high-frequency information capability, so that a great deal of research-and-development work has been made in order to fabricate thin-film type magnetic recording media. Thin-film type magnetic media can be fabricated by the vacuum evaporation, sputtering or electro- or chemical plating process and exhibit excellent short wavelength or high-frequency information recording capability. In general, thin magnetic films consist of Co; Co and Ni; Co and Cr; Co, Ni and Cr; Co and P; or Co, Ni and P.

Of the above-described three deposition processes, the sputtering process is not adapted for mass production because of slow sputtering or deposition rates. Furthermore, the thin magnetic film deposited by the sputtering process is not stable in maintaining its characteristics. On the other hand, the evaporation or deposition rate of the vacuum evaporation process is very fast and of the order of thousands of angstroms per second. In addition, stable thin magnetic films of high coercive force can be easily obtained when the supporting substrate is inclined at an angle to the incident beam of evaporating material. In this case, it is well known that the higher the oxygen content in the deposited thin film, the higher the coercive force $H_c$ becomes and that the larger the angle of vapor incidence, the higher the content of oxygen in the deposited thin film becomes. However, an increase in the angle of vapor incidence results in a remarkable decrease in the deposition rate.

OBJECTS AND SUMMARY OF THE INVENTION

The primary object of the present invention is, therefore, to provide a magnetic recording medium which can be easily mass-produced and which has a thin magnetic film which in turn is formed by the deposition mainly of Co; Co and Ni; Co and Cr; or Co, Ni and Cr by the vacuum evaporation process or the like over a supporting substrate made of nonmagnetic material and which has a oxygen content higher in a surface layer than a deeper layer below it so that the magnetic recording medium has a higher coercive force and exhibits excellent short wavelength or high-frequency information recording capability.

The thin magnetic film embodying the present invention is featured in that it comprises a native oxidized surface adjacent to the layer at surface and a deep layer below it; and the average oxygen contents are higher in the surface layer than in the deep layer.

CONCRETE DESCRIPTION OF THE PRIOR ART

Figure 1:
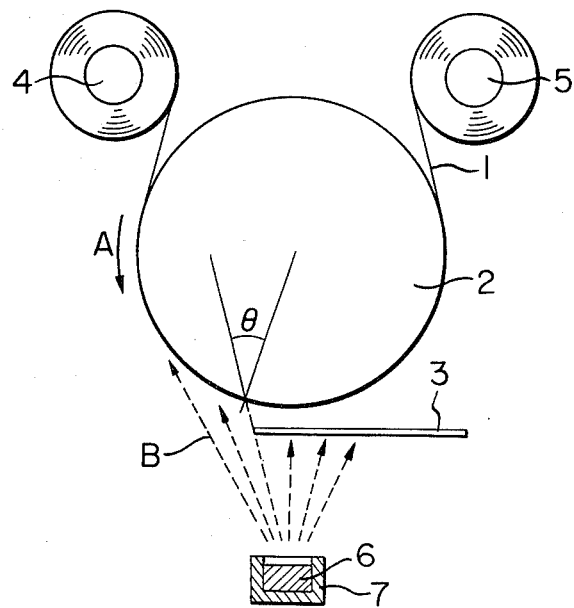
FIG. 1 is a schematic view used to explain an oblique incidence vacuum evaporation process.

FIG. 1 shows schematically a continuous vacuum evaporation apparatus for the continuous fabrication of a long length of magnetic recording medium. A tape-like substrate 1, which is made of a high-molecular compound, is transported along a cylindrical can 2 in the direction indicated by an arrow A. Therefore, the angle of incidence of the vapor beam of evaporating material 6 upon the surface of the substrate 1 continuously varies from the tangential to normal direction as indicated by arrows B. A mask 3 controls the angle of incidence of the vapor beam on a magnetic layer (this angle will be referred to as "the minimum incidence angle $\theta$" in this specification). Reference numeral 4 designates a supply roll; 5, a take-up roll; and 7, a heater for evaporating the evaporating material 6.

Figure 2:
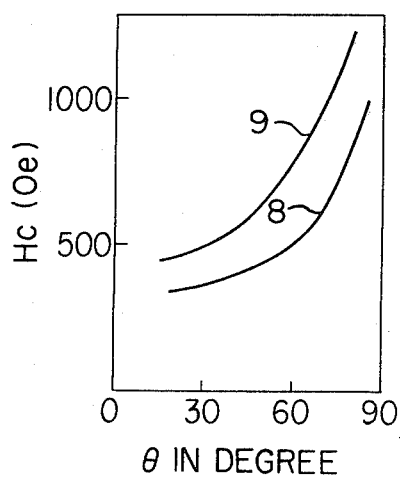
FIG. 2 is a graph showing the relationship between the coercive force $H_c$ and the minimum incidence angle $\theta$.

When Co or an alloy of Co and Ni; Co and Cr; or Co, Ni and Cr is evaporated by the apparatus as shown in FIG. 1, magnetic films or layers of excellent characteristics can be obtained. For instance, when a Co-Ni alloy (containing 20% by weight of Ni) magnetic film is deposited in the vacuum of $3 \times 10^{-5}$ torr and at the evaporation rate of 2000 Å/sec, the $H_c$-$\theta$ characteristic curve as shown by a curve 8 in FIG. 2 is obtained, where $H_c$ is the coercive force in the direction of transport of the substrate 1 when the evaporating material is deposited. It is seen that when the minimum incidence angle $\theta$ is greater than 60°, the coercive force $H_c$ becomes higher than 500 Oe.

When the evaporations are carried out in an oxygen atmosphere, the amount of oxygen present strongly influences the magnetic characteristics of the deposited thin magnetic films, as is well known in the art. The $H_c$-$\theta$ characteristic curve as indicated by 9 in FIG. 2 is obtained when a thin magnetic film is deposited by the evaporation of a Co-Ni alloy (containing 20% by weight of Ni) at the evaporation rate of about 2000 Å/sec and in the atmosphere in which the partial pressure of the oxygen is $6 \times 10^{-4}$ torr (the oxygen is substantially uniformly distributed in the process chamber). It is apparent that when thin magnetic films are deposited in the oxygen atmosphere, a high coercive force $H_c$ can be obtained. As a consequence, a high output signal can be obtained in the reproduction.

Figure 3:
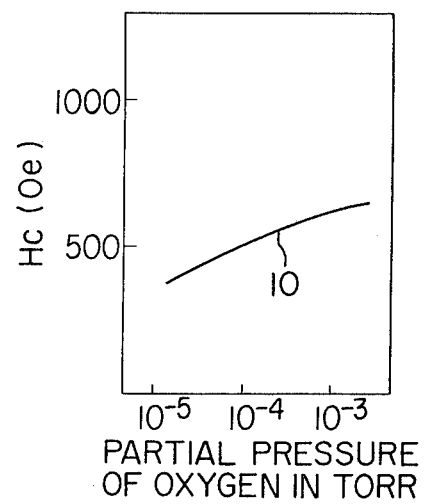
FIG. 3 is a graph showing the relationship between the partial pressure of the oxygen in the evaporation atmosphere and the resulting coercive force $H_c$ of deposited thin magnetic films.

FIG. 3 shows the characteristic curve 10 showing the relationship between the coercive force $H_c$ and the partial pressure in torr of the oxygen in the evaporation atmosphere when the minimum incidence angle $\theta$ is 45°. It is seen that with increase in the oxygen partial pressure, the coercive force $H_c$ increases.

Figure 4:
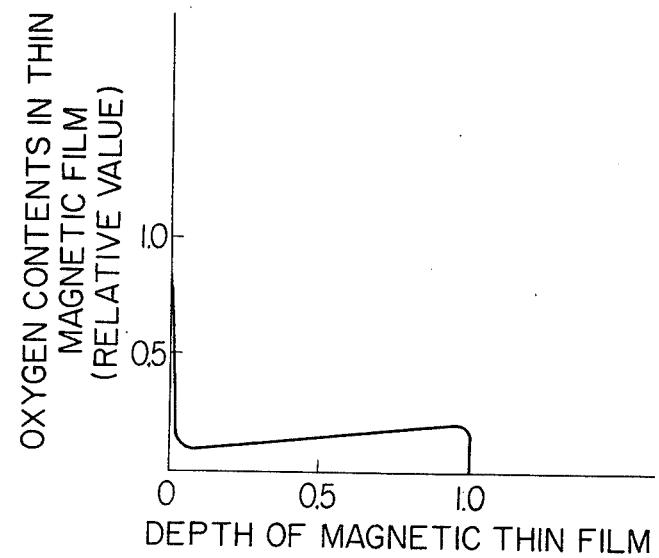
FIG. 4 shows the distribution of oxygen content in the direction of thickness of a deposited thin magnetic film.

FIG. 4 shows the oxygen distribution in the direction of thickness of a thin magnetic film deposited in the oxygen atmosphere. The contents of oxygen are plotted along the ordinate while the depth of the thin magnetic film, along the abscissa. Depth 0 indicates the surface of the thin film and 1.0, the interface between the thin magnetic film and the substrate. The oxygen distribution can be measured by Auger electron spectroscopy.

When the apparatus as shown in FIG. 1 is used, the angle of vapor incidence is greater at or in the proximity of the interface between the thin film and the substrate. In addition, the distance between the substrate and the evaporant source is long. As a result, the deposition or evaporation rate becomes low so that the contents of the oxygen in the thin film are slightly higher in the proximity of the interface between the thin film and the substrate than in the proximity of the surface of the thin film. Analyses by Auger electron spectroscopy and transmission electron diffraction showed that the oxygen is present in the thin films in the form of oxides of metals. From FIG. 4 it is seen that a layer at about 10 Å in depth from the surface of the thin film has high oxygen content. This native oxidized layer at the film surface is formed by the absorption of oxygen after the deposited thin film is discharged out of the process chamber into the atmosphere.

As described above, magnetic recording media of excellent characteristics can be fabricated by the oblique incidence vacuum evaporation process and their characteristics can be further improved when thin magnetic films are deposited in the oxygen atmosphere. However, high productivity as well as further improvements of their characteristics are desired. For instance, in order to obtain satisfactory recording and reproduction characteristics in a sub-micron wavelength signal region, a coercive force $H_c$ at least higher than 800 Oe is needed. With the prior art process, the minimum incidence angle $\theta$ must be greater than 60° as described previously with reference to the characteristic curve 9 shown in FIG. 2. However, if the minimum incidence angle $\theta$ is increased in excess of 60°, the description rate drops considerably and consequently productivity drops. Therefore, it is preferable to maintain the minimum incidence angle $\theta$ less than 50°.

DESCRIPTION OF THE PREFERRED EMBODIMENTS

Figure 5:
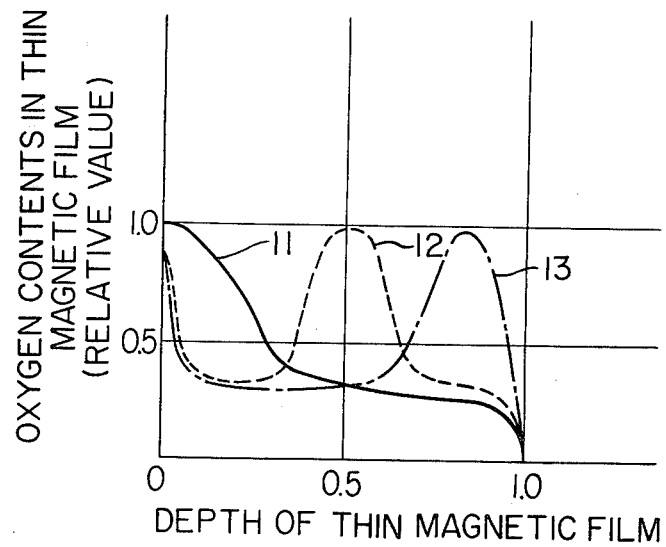
FIG. 5 shows various types of oxygen content distributions in the direction of thickness of deposited thin magnetic films.

In the case of the deposition of thin magnetic films on nonmagnetic substrates by the vacuum evaporation process by evaporating Co; Co and Ni; Co and Cr; or Co, Ni and Cr in an atmosphere containing oxygen, the oxygen content distribution in the direction of thickness of the deposited thin magnetic films can be divided into three types depending upon the partial pressure distribution of the oxygen in the chamber. For the sake of explanation, a thin magnetic film is assumed to comprise a native oxidized surface adjacent to the layer at the surface, an intermediate layer and a back surface layer adjacent to the interface between the thin film and the substrate. The combination of the intermediate and back surface layers is referred to as the deep layer. Then, a first oxygen content distribution type is such that the average oxygen content in the surface layer is higher than that in the deep layer as indicated by a curve 11 in FIG. 5. A second type is such that the content in the intermediate layer is higher than the average content in the surface and back surface layers as indicated by a curve 12 in FIG. 5. A third type is such that the average oxygen content in the back surface layer is higher than the average content in the surface and intermediate layers as indicated by a curve 13 in FIG. 5.

For instance, a thin magnetic film with the first oxygen content distribution type (curve 11) can be deposited in an atmosphere in which the partial pressure of the oxygen is higher adjacent to the mask 3 in the apparatus as shown in FIG. 1 than in the remaining portion.

Figure 6:
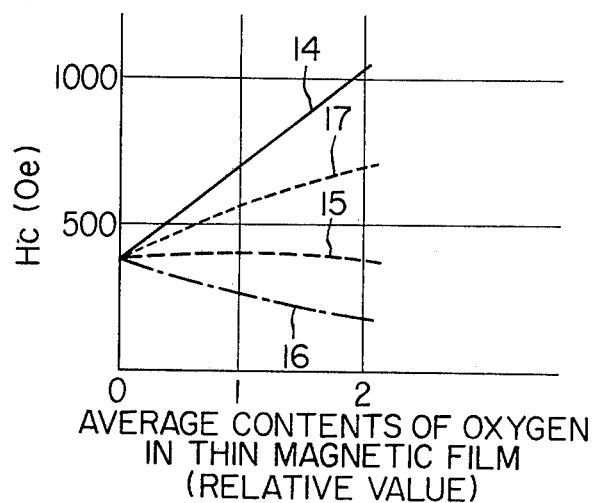
FIG. 6 is a graph showing the relationships between the coercive force and average oxygen contents in deposited magnetic thin films.

With the vacuum evaporation apparatus as shown in FIG. 1, Co-Ni thin magnetic films (containing 20% by weight of Ni) with three oxygen content distribution types as described above were prepared. The minimum incidence angle $\theta$ was maintained at 45° and the coercive force $H_c$ in the direction of transport of the substrate during the evaporation process was measured. The results are shown in FIG. 6, in which the coercive force $H_c$ is plotted along the ordinate while the average contents of oxygen in the deposited thin films is plotted along the abscissa. Curves 14, 15 and 16 shown in FIG. 6 correspond to the films having the oxygen content of curves 11, 12 and 13, respectively, shown in FIG. 5. In the case of the thin magnetic films with the first oxygen content distribution type (the curve 11 in FIG. 5), the higher the average oxygen content in the thin magnetic film, the higher the coercive force $H_c$ becomes and subsequently the more excellent the high-frequency (short wavelength) recording and reproducing characteristics become. However, in the case of the thin magnetic film with the third oxygen content distribution type (the curve 13 in FIG. 5), the coercive force $H_c$ is low and subsequently the high-frequency recording and reproducing characteristics are degraded. Thus, it is apparent that in order to attain optimum high-frequency recording and reproducing characteristics, the oxygen contents must be distributed as indicated by the curve 11 in FIG. 5. When a thin magnetic film is deposited in an atmosphere in which the partial pressure of the oxygen is uniformly distributed, the characteristic as indicated by a curve 17 in FIG. 6 is obtained. It is seen that the coercive force $H_c$ is remarkably lower than that of the thin films embodying the present invention. That is, according to a present invention, thin magnetic films with the coercive force of higher than 800 Oe can be obtained at the minimum incidence angle of 45°, but according to the prior art process, a coercive force of higher than 800 Oe cannot be obtained at the minimum incidence angle of 45°.

So far, the present invention has been described in conjunction with the deposition of a Co-Ni alloy (containing 20% by weight of Ni), but similar effects and characteristics were also obtained in the cases of depositions of Co-Ni; Co-Cr; and Co-Ni-Cr alloys and Co alone.

Figure 7:
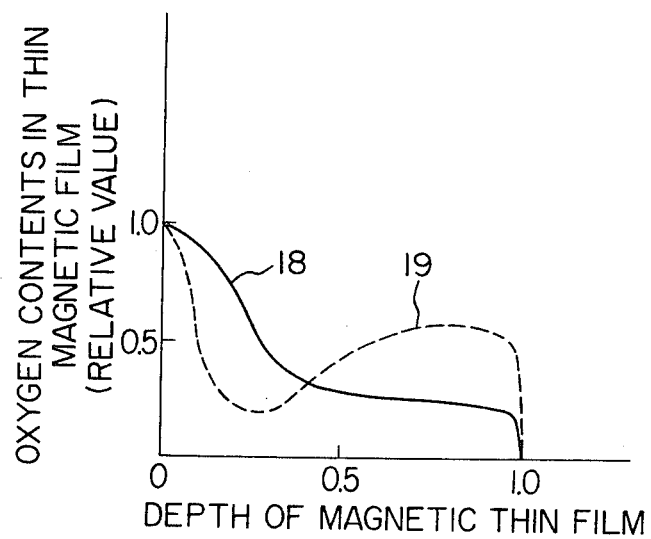
FIG. 7 shows the oxygen contents distributions in the direction of thickness of thin magnetic films.

In the case of the first type oxygen content distribution; that is, when the average oxygen content is higher in the surface layer than in the deep layer, two subtypes can be considered as indicated by curves 18 and 19 in FIG. 7. In terms of magnetic recording-and-reproducing characteristics, the thin magnetic film with the oxygen content distribution as indicated by the curve 18 is superior to the thin magnetic film with the oxygen content distribution type as indicated by the curve 19. It is assumed that the surface layer has a thickness equal to one third of the thickness of a thin magnetic film. Then the curve 18 shows that the average content of the oxygen is higher in the surface layer than in the deep layer and the curve 19 shows that the average oxygen content is higher in the deep layer than in the surface layer. This means that recording media of excellent characteristics can be fabricated by making the average oxygen content higher in the surface layer, whose thickness is equal to one third of the total thickness of a thin magnetic film, than in the deep or remaining layer. In order to obtain thin magnetic films with higher coercive forces $H_c$, it is preferable that the average oxygen content in the surface layer is in excess of 1.2 times as high as that in the deep layer and that the number of oxygen atoms in the thin film is higher by 25% than the number of metal atoms.

Figure 8:
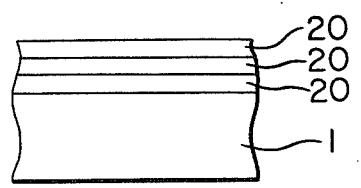
FIG. 8 shows a multi-layer thin magnetic film embodying the present invention.
Figure 9:
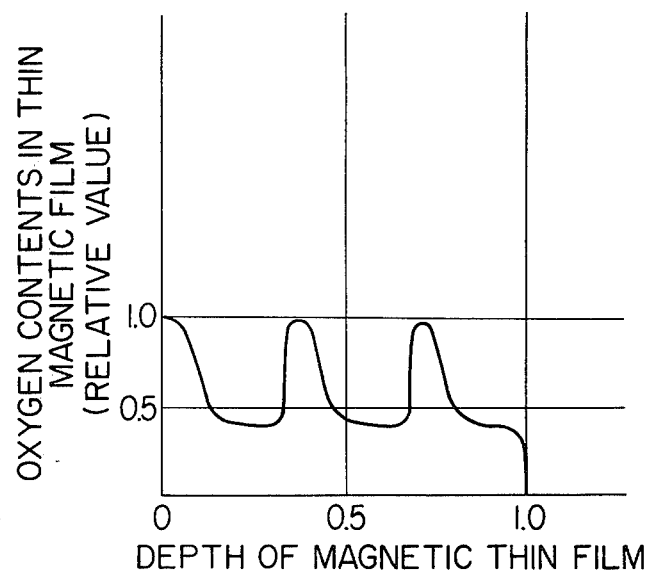
FIG. 9 is a graph showing the oxygen contents distribution in the direction of thickness of the magnetic thin film shown in FIG. 8.

So far, the present invention has been described in conjunction with the deposition of only one thin magnetic film over a nonmagnetic substrate, but it is to be understood that the present invention can be equally applied to the depositions of multi-layer thin magnetic films. For instance, as shown in FIG. 8, three layers 20 may be overlaid over the substrate 1, each of the layers 20 having the oxygen content distribution as indicated by the curve 11 in FIG. 5. The overall oxygen content distribution in the magnetic layer (that is, the thin film comprising three layers 20) is shown in FIG. 9.

Next, a more specific embodiment of the present invention will be described. With the vacuum evaporation apparatus as shown in FIG. 1, a Co-Ni alloy (containing 20% by weight of Ni) is deposited to the thickness of 1200 Å at the minimum incidence angle $\theta$ of 40° over a substrate made of polyethylene terephthalate. The average deposition rate is 2500 Å/sec and the evaporation atmosphere is so controlled that the partial pressure of the oxygen is higher in the vicinity of the mask 3 than in other portions. The oxygen content distribution in the deposited thin film is measured by Auger electron spectroscopy. The result is similar to the curve or profile 18 shown in FIG. 7. The number of oxygen atoms in the thin film is about 35% of the total number of Co and Ni atoms. The magnetic characteristics are measured by the vibrating sample magnetometer and the results are that the coercive force $H_c$ is 820 Oe; the saturation magnetization $M_s$ is 530 emu/cc; and the squareness ratio is 0.88. When the sinusoidal waveform of the wavelength of 0.8 μm is recorded on the recording media thus obtained and reproduced, the output is higher than 14 dB as compared with a magnetic tape for VTR of the coated type in which a powder of oxide iron containing Co is coated over a substrate.

In summary, according to the present invention, magnetic recording media of high coercive force and excellent high-frequency (short wavelength) recording and reproducing characteristics can be fabricated with a higher degree of productivity.

What is claimed is:

1. A magnetic recording medium comprising a thin magnetic film having a major component selected from the group consisting of (i) cobalt, (ii) cobalt and nickel, (iii) cobalt and chromium, and (iv) cobalt, nickel and chromium disposed on a non-magnetic substrate, said thin magnetic film having a native oxidized surface, a sub-surface layer beneath and adjacent said surface, and a deep layer beneath and adjacent said subsurface layer, the average oxygen content of said subsurface layer being greater than the average oxygen content in said deep layer.

2. A magnetic recording medium as set forth in claim 1, wherein the thickness of said subsurface layer is equal to about one third of the thickness of said thin magnetic film.

3. A magnetic recording medium as set forth in claim 1, wherein a plurality of thin magnetic films are overlaid over said substrate.

4. A magnetic recording medium as set forth in claim 2, wherein the average oxygen content in said subsurface layer is in excess of 1.2 times as high as that in said deep layer.

5. A magnetic recording medium as set forth in claim 1, wherein the number of oxygen atoms in said thin magnetic film is higher by 25% than the total number of metal atoms in said film.

6. A magnetic recording medium as set forth in claim 1, wherein said thin magnetic film is deposited by the vacuum evaporation process in an atmosphere containing oxygen.

7. A magnetic recording medium as set forth in claim 1, wherein said thin magnetic film is deposited in an atmosphere containing oxygen by an oblique incidence vacuum evaporation process.

* * * * *